(12) United States Patent
Crowley et al.

(10) Patent No.: US 12,258,839 B2
(45) Date of Patent: Mar. 25, 2025

(54) COMPENSATOR PISTON FOR A SHUNT CLOSURE

(71) Applicant: Halliburton Energy Services, Inc., Houston, TX (US)

(72) Inventors: Scott Crowley, Addison, TX (US); Ryan M. Novelen, Carrollton, TX (US); Stephen Michael Greci, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 139 days.

(21) Appl. No.: 18/117,337

(22) Filed: Mar. 3, 2023

(65) Prior Publication Data
US 2024/0295160 A1   Sep. 5, 2024

(51) Int. Cl.
| | | |
|---|---|---|
| *E21B 34/14* | (2006.01) | |
| *E21B 23/04* | (2006.01) | |
| *E21B 43/04* | (2006.01) | |
| *F16K 31/00* | (2006.01) | |
| *F16K 31/122* | (2006.01) | |

(52) U.S. Cl.
CPC .......... *E21B 34/14* (2013.01); *E21B 23/0412* (2020.05); *E21B 43/04* (2013.01); *F16K 31/002* (2013.01); *F16K 31/122* (2013.01)

(58) Field of Classification Search
CPC ............... E21B 34/12–14; E21B 43/04; E21B 23/0412; F16K 31/002; F16K 31/122; Y10T 137/7737
See application file for complete search history.

(56) References Cited

U.S. PATENT DOCUMENTS

| | | | |
|---|---|---|---|
| 5,056,600 A | * | 10/1991 | Surjaatmadja .......... E21B 34/16 |
| | | | 251/47 |
| 6,298,916 B1 | | 10/2001 | Tibbles et al. |
| 7,597,150 B2 | | 10/2009 | Clem |
| (Continued) | | | |

FOREIGN PATENT DOCUMENTS

| | | | | |
|---|---|---|---|---|
| KR | 101239706 B1 | | 3/2013 | |
| WO | WO-2023235286 A1 | * | 12/2023 | ............. E21B 34/06 |

OTHER PUBLICATIONS

International Search Report & Written Opinion in PCT/US2023/016962, mailed Nov. 21, 2023.

*Primary Examiner* — Jessica Cahill
(74) *Attorney, Agent, or Firm* — The Hilton Firm PLLC

(57) ABSTRACT

Shunt closures with a compensating piston and methods of using the same. An example shunt closure includes a compensator piston disposed between an oil chamber and a piston chamber and configured to translate towards the piston chamber to allow for an increase in the volume of the oil chamber. The shunt closure also includes a piston coupling connected to the compensator piston; wherein a portion of the piston coupling is configured to translate into the piston chamber upon translation of the compensator piston. The shunt closure further includes the piston chamber configured to house a portion of the piston coupling and the oil chamber configured to house an oil. Thermal expansion of the oil applies pressure to the compensator piston. The shunt closure also includes a shunt isolation sleeve coupled to and adjacent to the piston chamber.

20 Claims, 7 Drawing Sheets

(56) References Cited

U.S. PATENT DOCUMENTS

| | | | | |
|---|---|---|---|---|
| 7,857,061 | B2* | 12/2010 | Richards | E21B 34/103 |
| | | | | 166/334.4 |
| 8,453,734 | B2 | 6/2013 | Jasek et al. | |
| 9,637,999 | B2 | 5/2017 | Garcia et al. | |
| 10,370,946 | B2* | 8/2019 | Malbrel | E21B 43/128 |
| 11,319,759 | B1* | 5/2022 | Mahendran | E21B 33/146 |
| 11,746,621 | B2* | 9/2023 | Greci | E21B 34/102 |
| | | | | 166/373 |
| 2007/0044962 | A1 | 3/2007 | Tibbles | |
| 2007/0240883 | A1 | 10/2007 | Telfer | |
| 2013/0312960 | A1* | 11/2013 | Jasek | E21B 43/04 |
| | | | | 166/278 |
| 2018/0003019 | A1* | 1/2018 | Greci | E21B 43/2406 |
| 2020/0011155 | A1* | 1/2020 | Stamm | E21B 43/086 |
| 2021/0140280 | A1 | 5/2021 | Malone et al. | |

* cited by examiner

COMPENSATOR PISTON FOR A SHUNT CLOSURE

TECHNICAL FIELD

The present disclosure relates generally to wellbore operations, and more particularly, to the use of a compensator piston to compensate for a pressure increase due to the thermal expansion of an oil in an oil chamber of a shunt closure.

BACKGROUND

In some well completions, a gravel packing operation may be employed to provide filtration to keep sand in unstable production zones from entering a well stream. The gravel packing operation may include pumping a gravel slurry into a well having a plurality of production zones. Packers may be set in the well to separate the production zones. If the packers are set prior to placing the gravel slurry, then the gravel must be transported past the packers to complete the wellbore operation. A shunt closure may be used to transport gravel to the desired downhole location while bypassing a packer. The shunt closure may then close off the shunt tube when the gravel has been successfully transported. The shunt closure allows for the bypassing of a packer, but also maintains the desired zonal isolation when closed. The shunt closure may utilize an oil chamber for operation and placement of the shunt closure. The oil in the oil chamber may be subject to thermal expansion when placed at the desired depth. If the oil in the oil chamber thermally expands it could place stress on the shunt closure or nearby wellbore equipment and conduits.

Mitigating pressure buildup within a shunt closure may protect the shunt closure and other well equipment from stress and damage. The present invention provides improved apparatus and methods for operating a shunt closure.

BRIEF DESCRIPTION OF THE DRAWINGS

Illustrative examples of the present disclosure are described in detail below with reference to the attached drawing figures, which are incorporated by reference herein, and wherein.

Figure 1:
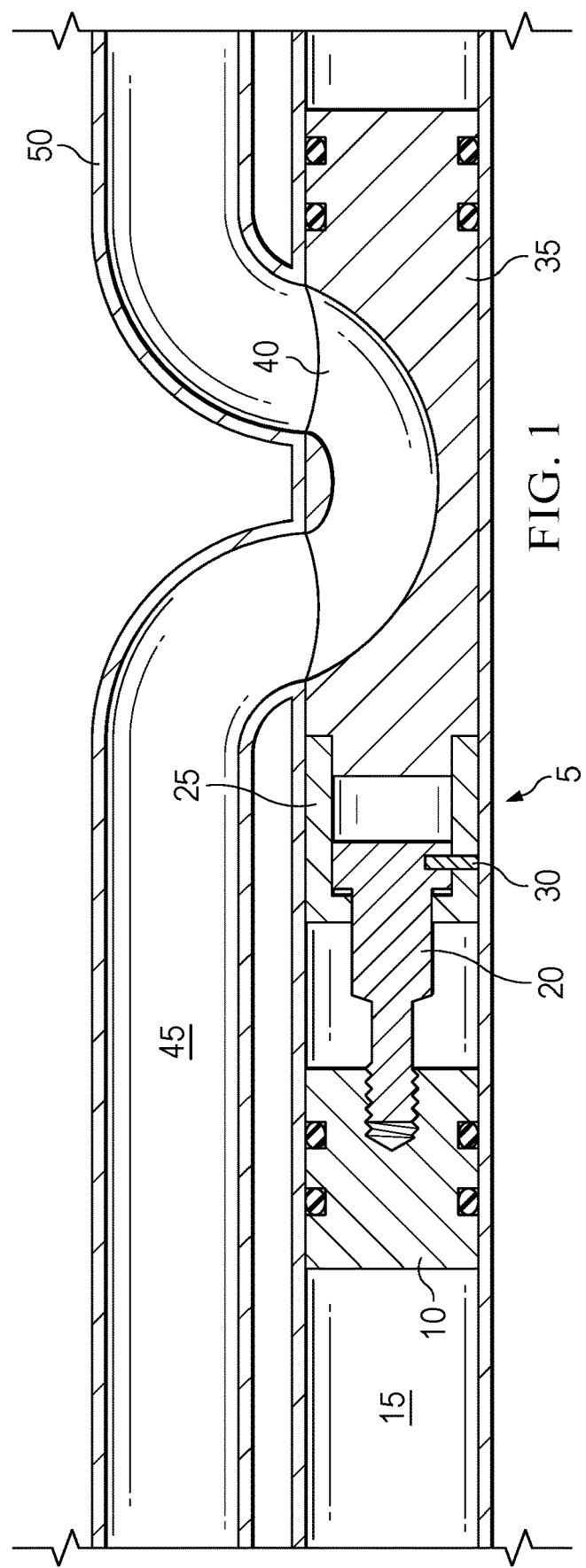
FIG. 1 is a cross-section illustrating an example shunt closure in its initial or run-in-hole configuration in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of a compensator piston to compensate for a pressure increase due to the thermal expansion of an oil in an oil chamber of a shunt closure.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The present disclosure relates generally to wellbore operations, and more particularly, to the use of a compensator piston to compensate for a pressure increase due to the thermal expansion of an oil in an oil chamber of a shunt closure. One advantage of the compensator piston is that it may allow for the oil chamber to maintain a constant pressure despite an increase in the wellbore temperature and that of the oil as the shunt closure is transported downhole. Another advantage of the compensator piston is that it may mitigate the damaging effects of thermal expansion thereby preventing stress and damage to the shunt closure or other nearby wellbore equipment or conduits. One other advantage of the compensator piston is that its use does not impede function of the shunt closure and gravel may continue to bypass a packer or other obstacle while any pressure buildup due to thermal expansion is mitigated by the compensator piston. An additional advantage is that the compensator piston and other associated components may be shifted when the shunt closure is to be closed without impact to the closing of the gravel transport bypass pathway. A further advantage is that the thermal expansion of the oil actuates the compensating mechanism of the compensator piston and active management or actuation is not needed to ensure sufficient compensating by the compensator piston as its mechanism is passively operated.

The shunt closure comprises a compensator piston disposed between an oil chamber and a piston chamber. The compensator piston is configured to translate towards the piston chamber to increase the volume of the oil chamber. If thermal expansion of the oil in the oil chamber occurs, the volume of oil increases. This increasing volume increases the pressure of the oil against the compensator piston. The compensator piston may then translate towards the piston chamber once a pressure differential threshold has been surpassed. The compensator piston comprises piston seals to seal the oil within the oil chamber and to prevent the oil from flowing past the compensator piston towards the piston chamber. The compensator piston is configured to be able to translate due to thermal expansion, and this translation occurs without altering the position of the shunt isolation sleeve and the gravel flow path.

The shunt closure comprises an oil chamber adjacent to the compensator piston and on an opposing side of the compensator piston relative to the piston chamber. The oil chamber contains an oil, which may be a clean oil. The oil chamber is sealed on one side by the piston seals of the compensator piston. Thermal expansion of the oil in the oil chamber may occur due to increasing wellbore temperatures. As the oil increases in temperature it applies pressure to one face of the compensator piston as described above. The compensating piston is designed to have enough travel to account for the volume change due to the temperature increase downhole.

The shunt enclosure further comprises a piston coupling. The piston coupling couples the compensator piston to the piston chamber. A portion of the piston coupling is coupled to the compensator piston. The piston coupling may be coupled to the compensator piston with a threaded connection, welding, bolting, swaging, adhesives, or any other sufficient coupling mechanism. Although the compensator piston and piston coupling are illustrated below as being two distinct pieces, it is to be understood that in some examples the compensator piston and piston coupling may be manufactured to be continuous with one another as one component and thus may not need to be coupled to one another with a coupling mechanism. The piston coupling is coupled to the compensator piston such that when the compensator piston translates towards the piston chamber, the piston coupling also translates towards the piston chamber. Another portion of the compensator piston is disposed within the piston chamber. The portion of the piston coupling within the piston chamber is also slidable within the piston chamber. The piston coupling moves inward into the piston chamber should the compensator piston apply sufficient pressure to overcome the pressure differential necessary to translate towards the piston chamber. The portion of the piston coupling within the piston chamber is slidable within the piston chamber, but is not slidable out of the piston chamber in such a way that the piston coupling can completely slide out of and be removed from the piston chamber.

In some optional examples, a retaining mechanism may be implemented with the shunt closure. In these optional examples, the piston coupling may be held in an initial position of the piston chamber by a retaining mechanism such as a spring or a shear pin, thereby allowing the piston coupling to retain its position during the fill of the oil chamber. The retaining mechanism prevents the piston coupling from moving further inward of the piston chamber. The retaining mechanism is selected and configured within the shunt closure to require a sufficient pressure differential to allow movement of the compensator piston towards the piston chamber and consequently to move the piston coupling inwards of the piston chamber. Once a pressure threshold has been reached, the pressure applied by the compensator piston will shear a shear pin or compress a spring to allow inward movement of the piston coupling within the piston chamber. This inward movement of the piston coupling due to the pressure applied by the compensator piston results in the expansion of the available volume of the oil chamber. The increased volume of the oil chamber may mitigate a pressure buildup due to the thermal expansion of the oil within the oil chamber.

The shunt closure additionally comprises a piston chamber which houses a portion of the piston coupling. The piston chamber is shaped in such a manner as to prevent the piston coupling from being completely removed from the piston chamber. For example, the piston chamber may comprise flanges that obstruct movement of the piston coupling out of the piston chamber by creating an opening smaller than a circumference of a portion of the piston coupling. Unlike the compensator piston, the piston chamber may not be sealed on its exterior and a fluid may flow into and around the piston chamber.

The shunt closure further comprises a shunt isolation sleeve. The shunt isolation sleeve is coupled to the piston chamber on the side opposing the entrance for the piston coupling. The shunt isolation sleeve may be coupled to the piston chamber with a threaded connection, welding, bolting, swaging, adhesives, or any other sufficient coupling mechanism. Although the shunt isolation sleeve and piston chamber are illustrated below as being two distinct pieces, it is to be understood that in some examples the shunt isolation sleeve and piston chamber may be manufactured to be continuous with one another as one component and thus may not need to be coupled to one another with a coupling mechanism. The shunt isolation sleeve comprises a U-bend shaped opening which serves as a gravel transport pathway. The gravel transport pathway opens to one conduit and exits to another to allow gravel to travel downhole. In some examples, the gravel may be used for a gravel pack. The gravel transport pathway couples two disparate conduits and allows the transition of gravel from one to another. The downhole end of the shunt isolation sleeve comprises isolation seals to prevent fluid flow uphole past the shunt isolation sleeve. The pressure within the oil chamber may be purposefully decreased to a point where the hydrostatic pressure downhole of the shunt isolation sleeve is larger than the pressure within the oil chamber. When this pressure differential occurs, the hydrostatic pressure may push the shunt isolation sleeve, and consequently the other components of the shunt closure, in the uphole direction. The entire shunt closure may shift until the isolation seals of the shunt closure align with the walls of the adjacent conduit in order to close the gravel transport pathway. As the shunt isolation sleeve is pushed uphole by the hydrostatic pressure, the piston chamber, piston coupling, and compensator piston are pushed along with it.

FIG. 1 is a cross-section illustrating an example shunt closure, generally 5, in its initial or run-in-hole configuration. The shunt closure 5 is placed into a wellbore to allow downstream gravel flow around a barrier, while also allowing for zonal isolation uphole and downhole of the shunt closure 5. A compensator piston 10 is disposed towards the uphole end of the shunt closure 5. An oil chamber 15 is disposed adjacent to a face of the compensator piston 10. The oil chamber 15 contains an oil and is sealed by isolation seals on the profile of the compensator piston 10. On the opposing side of the compensator piston 10 is a piston coupling 20, a portion of which is fixed to the compensator piston 10. A portion of the downhole side of the piston coupling 20 is disposed within a piston chamber 25. The piston chamber 25 is shaped such that the piston coupling 20 slidably engages with the interior of the piston chamber 25, but is unable to be completely removed from the piston chamber 25. In this initial configuration, an optional shear pin 30 holds the coupling piston 20 in place and does not allow translation of the coupling piston 20 within the piston chamber 25. Optional shear pin 30 may be used to prevent movement of the compensator piston 10 during the fill of the oil chamber 15. Coupled to the downhole end of the piston chamber 25 is a shunt isolation sleeve 35 which comprises a gravel transport pathway 40 shaped like a U-bend that connects to disparate conduits 45 and 50. The downhole portion of the shunt isolation sleeve 35 is sealed on its profile thereby preventing flow across the sealed portion of the shunt isolation sleeve 35.

Figure 2:
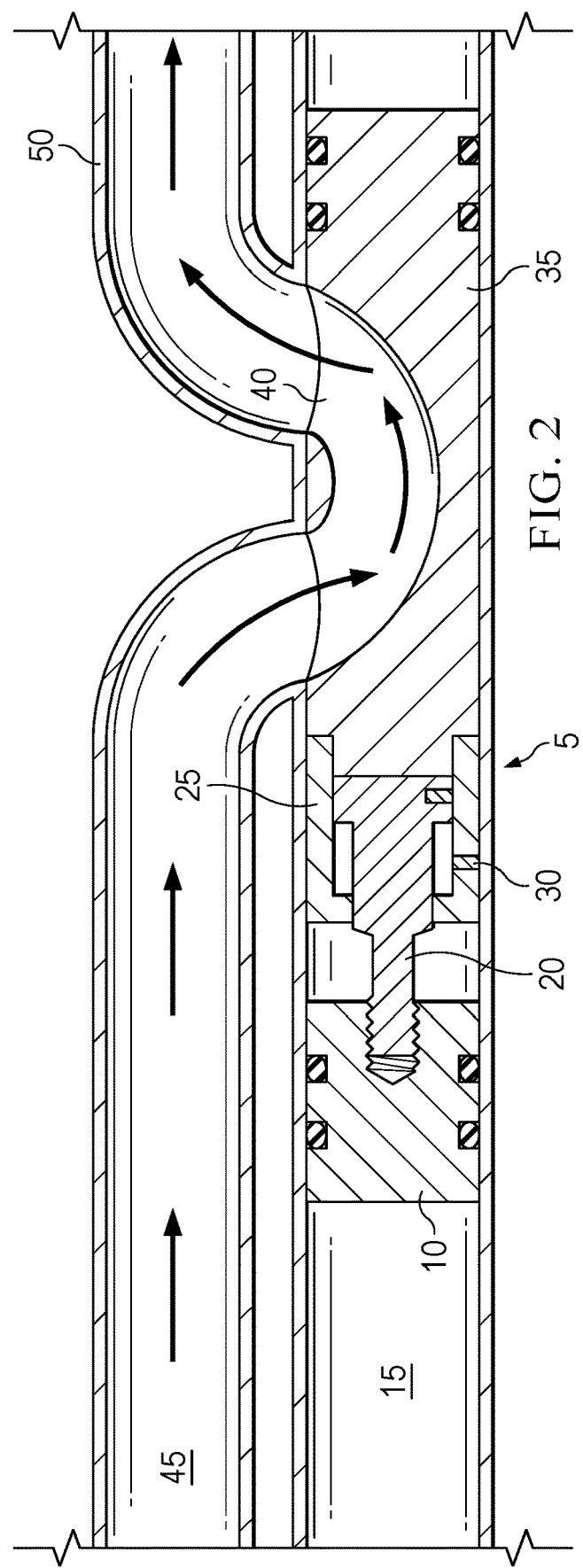
FIG. 2 is a cross-section illustrating the example shunt closure of FIG. 1 at depth and after thermal expansion of the oil has actuated the compensator piston in accordance with one or more examples described herein.

FIG. 2 is a cross-section illustrating the example shunt closure 5 of FIG. 1 at depth and after thermal expansion of the oil has actuated the compensator piston 10. At depth, the oil within the oil chamber 15 may undergo thermal expansion as the deeper subterranean locations may have a higher temperature. The thermal expansion of the oil increases the pressure in the oil chamber 15, and this pressure is applied to the compensator piston 10. Shunt closure 5 comprises an optional shear pin 30 which may be used to prevent movement of the compensator piston 10 during the fill of the oil chamber 15. As the piston coupling 20 is linked to the compensator piston 10, pressure is applied to the shear pin 30 by the piston coupling 20. When the pressure differential surpasses a predetermined threshold, the applied pressure will be sufficient to induce shearing of the shear pin 30. FIG. 2 illustrates the shear pin 30 in its sheared state. The shear pin 30 is no longer able to restrict movement of the piston coupling 20 within the piston chamber 25 and the piston coupling 20 slides deeper within the piston chamber 25. As the compensator piston 10 is linked to the piston coupling 20, the compensator piston 10 is allowed to be pushed towards the piston chamber 25 as illustrated. This movement of the compensator piston 10 towards the piston chamber 25 expands the available volume within the oil chamber 15. The additional volume within the oil chamber 15 mitigates the pressure increase from the thermal expansion of the oil within the oil chamber 15.

With continued reference to FIG. 2, gravel is transported downhole in conduit 45, then through the gravel transport pathway 40 that connects conduit 45 with conduit 50. The gravel transported in conduit 50 may be delivered downhole for use with a gravel pack or other operation.

Figure 3:
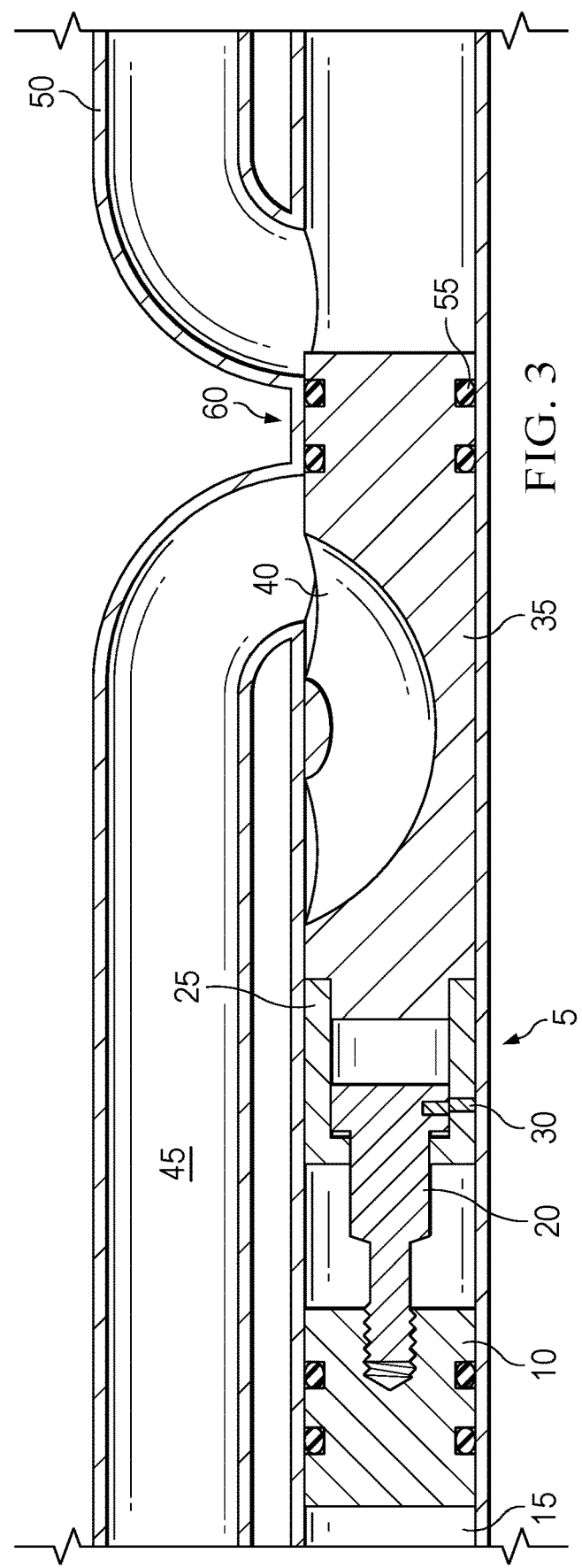
FIG. 3 is a cross-section illustrating the shunt closure of FIGS. 1 and 2 after shifting to close access to the gravel transport pathway in accordance with one or more examples described herein.

FIG. 3 is a cross-section illustrating how the shunt closure 5 of FIGS. 1 and 2 may be shifted to close access to the gravel transport pathway 40 from conduits 45 and 50. The shifting of the shunt closure 5 isolates the downhole and uphole zones from one another and blocks any further flow from conduit 45 to conduit 50. After the downhole transport of the gravel has concluded, a drop in pressure of the oil in the oil chamber 15 may be induced. This resulting pressure drop creates a pressure differential with the hydrostatic pressure on the downhole side of the shunt isolation sleeve 35. The hydrostatic pressure is then able to shift the shunt closure 5, and all its components, in the uphole direction. The isolation seals 55 on the downhole end of the shunt isolation sleeve 35 may shift uphole until they align with the transition point 60 between conduits 45 and 50. This transition point 60 has a concave bend somewhat approximating the bend of the gravel transport pathway 35. The isolation seals 55 align with this transition point 60 to isolate the zones uphole and downhole of the transition point 60. The exterior of the transition point 60 is where other wellbore tools, such as packer, may be installed. The shunt closure 5 allows gravel transport downhole of these wellbore tools as well as the ability to isolate the flow between of the zones on the either side of the wellbore tool.

It should be clearly understood that the example system illustrated by FIGS. 1-3 is merely a general application of the principles of this disclosure in practice, and a wide variety of other examples are possible. Therefore, the scope of this disclosure is not limited in any manner to the details of FIGS. 1-3 as described herein.

Figure 4:
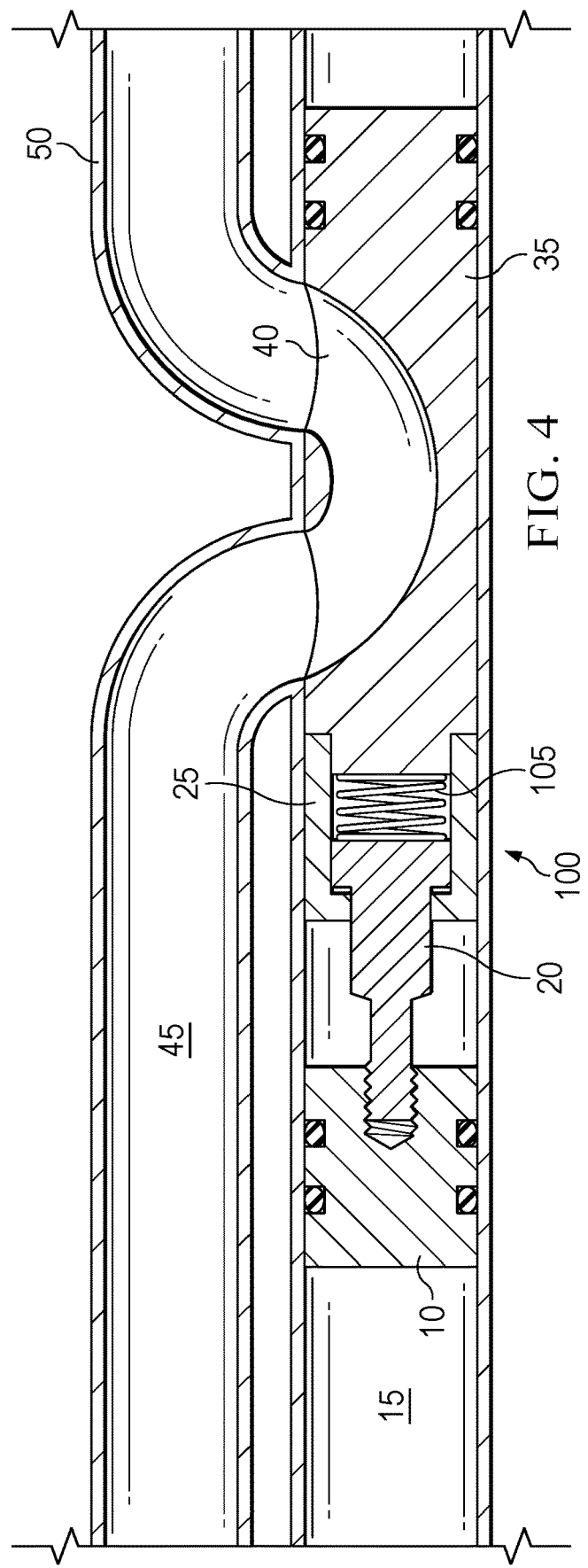
FIG. 4 is a cross-section illustrating another example shunt closure in its initial or run-in-hole configuration in accordance with one or more examples described herein.

FIG. 4 is a cross-section illustrating an example shunt closure, generally 100, in its initial or run-in-hole configuration. The shunt closure 100 is placed into a wellbore to allow downstream gravel flow around a barrier, while also allowing for zonal isolation uphole and downhole of the shunt closure 100. A compensator piston 10 is disposed towards the uphole end of the shunt closure 100. An oil chamber 15 is disposed adjacent to a face of the compensator piston 10. The oil chamber 15 contains an oil and is sealed by isolation seals on the profile of the compensator piston 10. On the opposing side of the compensator piston 10 is a piston coupling 20, a portion of which is fixed to the compensator piston 10. A portion of the downhole side of the piston coupling 20 is disposed within a piston chamber 25. The piston chamber 25 is shaped such that the piston coupling 20 slidably engages with the interior of the piston chamber 25, but is unable to be completely removed from the piston chamber 25. In this initial configuration, an optional spring 105 holds the coupling piston 20 in place and does not allow translation of the coupling piston 20 within the piston chamber 25. Optional spring 105 may be used to prevent movement of the compensator piston 10 during the fill of the oil chamber 15. Coupled to the downhole end of the piston chamber 25 is a shunt isolation sleeve 35 which comprises a gravel transport pathway 40 shaped like a U-bend that connects to disparate conduits 45 and 50. The downhole portion of the shunt isolation sleeve 35 is sealed on its profile thereby preventing flow across the sealed portion of the shunt isolation sleeve 35.

Figure 5:
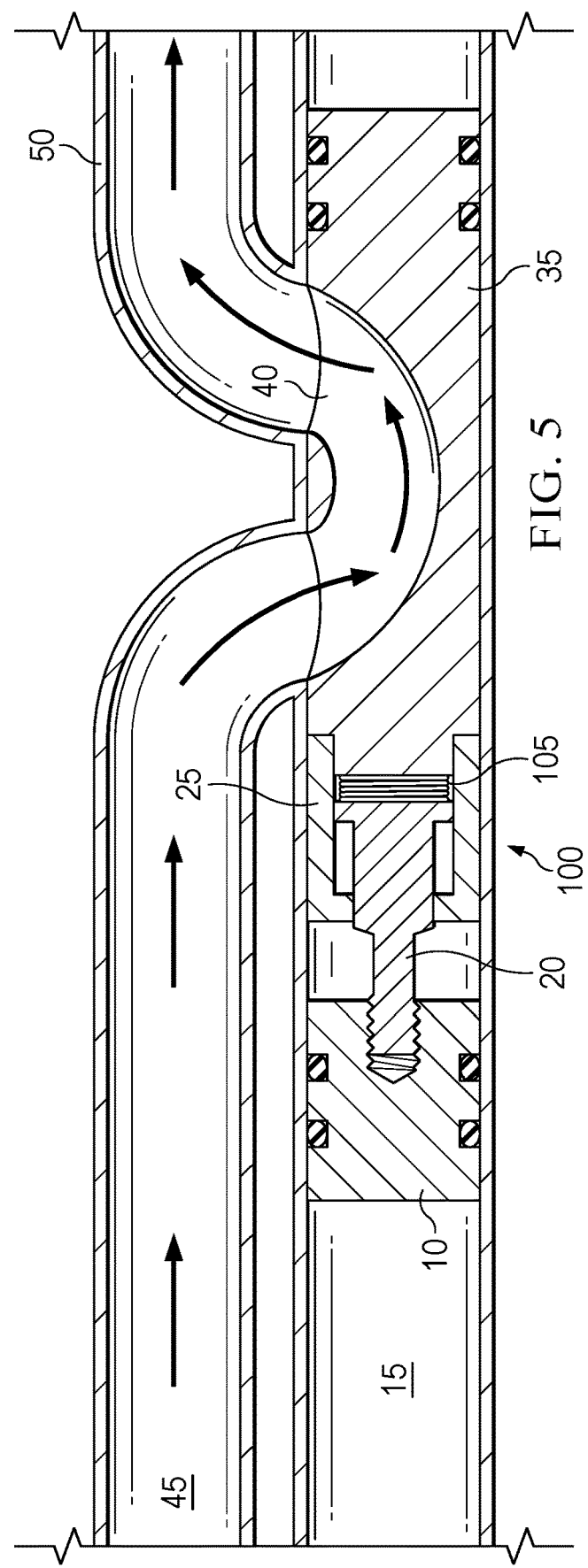
FIG. 5 is a cross-section illustrating the example shunt closure of FIG. 4 at depth and after thermal expansion of the oil has actuated the compensator piston in accordance with one or more examples described herein.

FIG. 5 is a cross-section illustrating the example shunt closure 100 of FIG. 1 at depth and after thermal expansion of the oil has actuated the compensator piston 10. At depth, the oil within the oil chamber 15 may undergo thermal expansion as the deeper subterranean locations may have a higher wellbore temperature. The thermal expansion of the oil increases the pressure in the oil chamber 15, and this pressure is applied to the compensator piston 10. As the piston coupling 20 is linked to the compensator piston 10, pressure is applied to the spring 105 by the piston coupling 20. When the pressure differential surpasses a predetermined threshold, the applied pressure will be sufficient to compress the spring 105. FIG. 5 illustrates the spring 105 in its compressed state. The spring 105 is no longer able to restrict movement of the piston coupling 20 within the piston chamber 25 and the piston coupling 20 slides deeper within the piston chamber 25. As the compensator piston 10 is linked to the piston coupling 20, the compensator piston 10 is allowed to be pushed towards the piston chamber 25 as illustrated. This movement of the compensator piston 10 towards the piston chamber 25 expands the available volume within the oil chamber 15. The additional volume within the oil chamber 15 mitigates the pressure increase from the thermal expansion of the oil within the oil chamber 15.

With continued reference to FIG. 5, gravel is transported downhole in conduit 45, then through the gravel transport pathway 40 that connects conduit 45 with conduit 50. The gravel transported in conduit 50 may be delivered downhole for use with a gravel pack or other operation.

Figure 6:
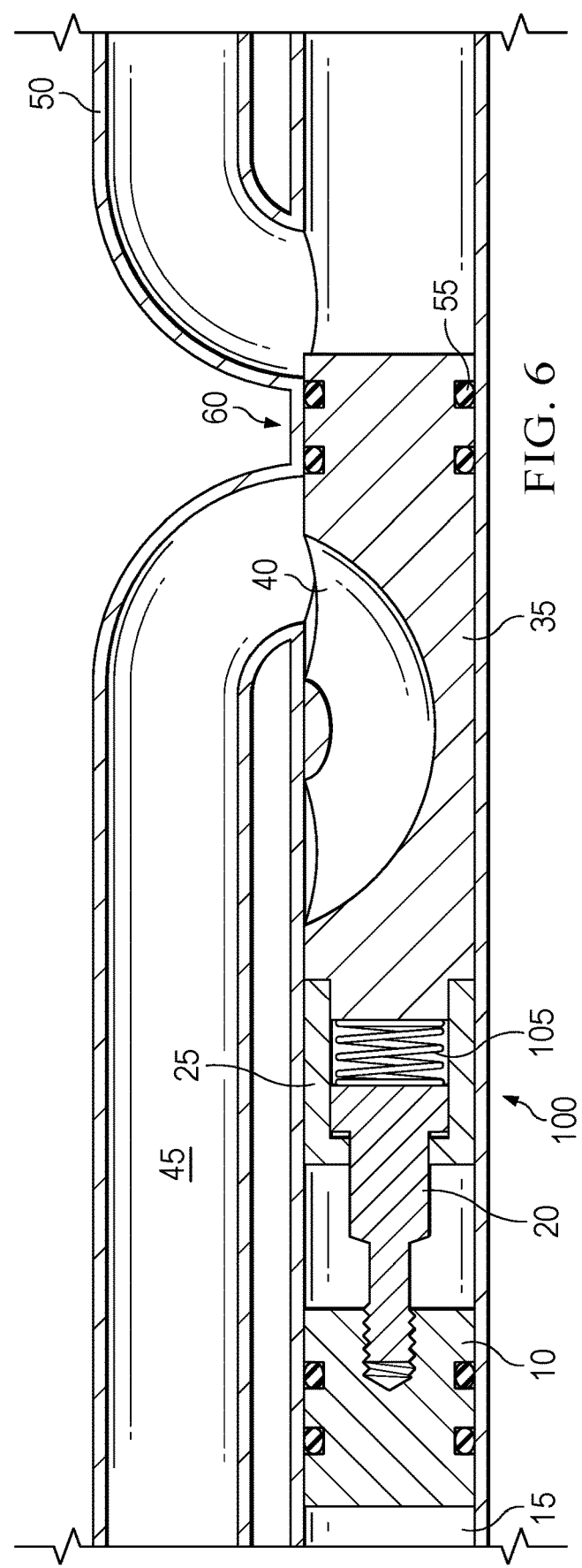
FIG. 6 is a cross-section illustrating the shunt closure of FIGS. 4 and 5 after shifting to close access to the gravel transport pathway in accordance with one or more examples described herein.

FIG. 6 is a cross-section illustrating how the shunt closure 100 of FIGS. 4 and 5 may be shifted to close access to the gravel transport pathway 40 from conduits 45 and 50. The shifting of the shunt closure 100 isolates the downhole and uphole zones from one another and blocks any further flow from conduit 45 to conduit 50. After the downhole transport of the gravel has concluded, a drop in pressure of the oil in the oil chamber 15 may be induced. This resulting pressure drop creates a pressure differential with the hydrostatic pressure on the downhole side of the shunt isolation sleeve 35. The hydrostatic pressure is then able to shift the shunt closure 100, and all its components, in the uphole direction. The isolation seals 55 on the downhole end of the shunt isolation sleeve 35 may shift uphole until they align with the transition point 60 between conduits 45 and 50. This transition point 60 has a concave bend somewhat approximating the bend of the gravel transport pathway 35. The isolation seals 55 align with this transition point 60 to isolate the zones uphole and downhole of the transition point 60. The exterior of the transition point 60 is where other wellbore tools, such as packer, may be installed. The shunt closure 100 allows gravel transport downhole of these wellbore tools as well as the ability to isolate the flow between of the zones on the either side of the wellbore tool.

It should be clearly understood that the example system illustrated by FIGS. 4-6 is merely a general application of the principles of this disclosure in practice, and a wide variety of other examples are possible. Therefore, the scope of this disclosure is not limited in any manner to the details of FIGS. 4-6 as described herein.

Figure 7:
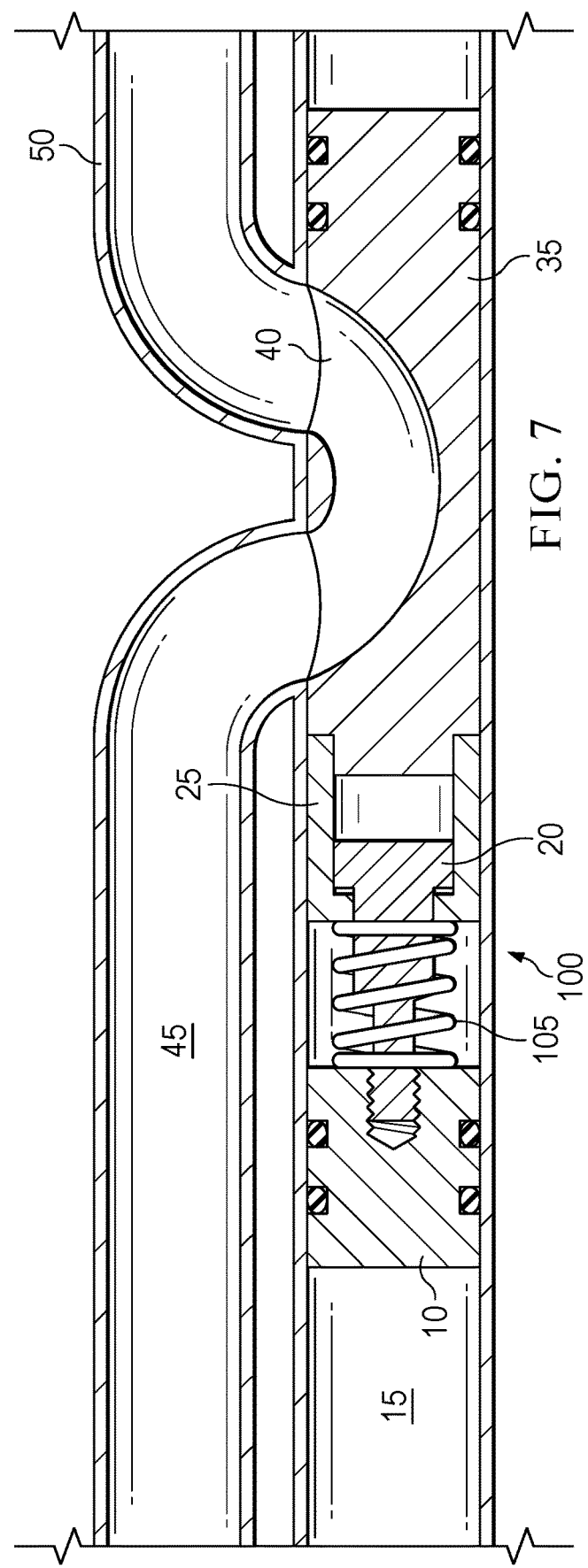
FIG. 7 is a cross-section illustrating another example shunt closure in its initial or run-in-hole configuration in accordance with one or more examples described herein.

FIG. 7 is a cross-section illustrating the example shunt closure 100 of FIG. 4 in its initial or run-in-hole configuration, but the spring 105 has been moved to a different location. In the example of FIG. 7, the spring 105 is disposed outside of the piston chamber 25 instead of inside the piston chamber 25 as illustrated by FIGS. 4-6. The other components of FIG. 7 function analogously to those illustrated by FIG. 4. In some alternative examples, two springs 105 may be used, with one placed inside the piston chamber 25 and the other placed outside piston chamber 25.

The shunt closure systems and associated system components disclosed herein may directly or indirectly affect one or more components or pieces of equipment associated with or which may come into contact with the shunt closure systems and associated system components such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are shunt closures with a compensating piston, in accordance with the disclosure and the illustrated FIGs. An example shunt closure comprises a compensator piston disposed between an oil chamber and a piston chamber and configured to translate towards the piston chamber to allow for an increase in the volume of the oil chamber. The shunt closure further comprises a piston coupling connected to the compensator piston; wherein a portion of the piston coupling is configured to translate into the piston chamber upon translation of the compensator piston. The shunt closure also comprises the piston chamber configured to house a portion of the piston coupling and the oil chamber configured to house an oil; wherein thermal expansion of the oil applies pressure to the compensator piston. The shunt closure additionally comprises a shunt isolation sleeve coupled to and adjacent to the piston chamber.

Additionally or alternatively, the shunt closure may include one or more of the following features individually or in combination. The compensator piston may be configured such that thermal expansion of the oil applies pressure to the compensator piston to translate the compensator piston towards the piston chamber. The shunt closure may further comprise a shear pin coupled to the piston coupling. The shear pin may be configured to hold the piston coupling in an initial position until the compensator piston applies enough pressure to the piston coupling to shear the shear pin; wherein the pressure applied by the compensator piston to the piston coupling is due to the thermal expansion of the oil in the oil chamber. The shunt closure may further comprise a spring coupled to the piston coupling. The spring may be configured to hold the piston coupling in an initial position until the compensator piston applies enough pressure to the piston coupling to compress the spring; wherein the pressure applied by the compensator piston to the piston coupling is due to the thermal expansion of the oil in the oil chamber. The spring may be coupled to the piston coupling within the piston chamber. The spring may be coupled to the piston coupling outside of the piston chamber. The compensator piston may be configured to compensate for the volumetric expansion of the oil from thermal expansion without altering the position of the shunt isolation sleeve. The shunt isolation sleeve may comprise a gravel transport pathway. The shunt isolation sleeve may be configured to translate towards the oil chamber thereby pushing the compensator piston, piston coupling, and piston housing towards the oil chamber; wherein this movement towards the oil chamber also closes the gravel transport pathway.

Provided are methods for compensating for pressure increases in the oil chamber of a shunt closure in accordance with the disclosure and the illustrated FIGs. An example method comprises providing a shunt closure comprising: a compensator piston disposed between an oil chamber and a piston chamber; a piston coupling connected to the compensator piston; the piston chamber configured to house a portion of the piston coupling; the oil chamber configured to house an oil; and a shunt isolation sleeve coupled to and adjacent to the piston chamber. The method further comprises translating the compensator piston towards the piston chamber to increase the volume of the oil chamber when thermal expansion of the oil occurs; and translating a portion of the piston coupling into the piston chamber upon translation of the compensator piston.

Additionally or alternatively, the method may include one or more of the following features individually or in combination. The compensator piston may be configured such that thermal expansion of the oil applies pressure to the compensator piston to translate the compensator piston towards the piston chamber. The shunt closure may further comprise a shear pin coupled to the piston coupling. The shear pin may be configured to hold the piston coupling in an initial position until the compensator piston applies enough pressure to the piston coupling to shear the shear pin; wherein the pressure applied by the compensator piston to the piston coupling is due to the thermal expansion of the oil in the oil chamber. The shunt closure may further comprise a spring coupled to the piston coupling. The spring may be configured to hold the piston coupling in an initial position until the compensator piston applies enough pressure to the piston coupling to compress the spring; wherein the pressure applied by the compensator piston to the piston coupling is due to the thermal expansion of the oil in the oil chamber. The spring may be coupled to the piston coupling within the piston chamber. The spring may be coupled to the piston coupling outside of the piston chamber. The compensator piston may be configured to compensate for the volumetric expansion of the oil from thermal expansion without altering the position of the shunt isolation sleeve. The shunt isolation sleeve may comprise a gravel transport pathway. The shunt isolation sleeve may be configured to translate towards the oil chamber thereby pushing the compensator piston, piston coupling, and piston housing towards the oil chamber; wherein this movement towards the oil chamber also closes the gravel transport pathway.

Provided are systems for compensating for pressure increases in the oil chamber of a shunt closure in accordance with the disclosure and the illustrated FIGs. An example system comprises a shunt closure comprising: a compensator piston disposed between an oil chamber and a piston chamber and configured to translate towards the piston chamber to increase the volume of the oil chamber; a piston coupling connected to the compensator piston; wherein a portion of the piston coupling is configured to translate into the piston chamber upon translation of the compensator piston; the piston chamber configured to house a portion of the piston coupling; the oil chamber configured to house an oil; wherein thermal expansion of the oil applies pressure to the compensator piston; and a shunt isolation sleeve coupled to and adjacent to the piston chamber. The system further comprises a conduit adjacent to the shunt closure.

Additionally or alternatively, the system may include one or more of the following features individually or in combination. The conduit adjacent to the shunt closure may transport gravel to the gravel transport pathway. The compensator piston may be configured such that thermal expansion of the oil applies pressure to the compensator piston to translate the compensator piston towards the piston chamber. The shunt closure may further comprise a shear pin coupled to the piston coupling. The shear pin may be configured to hold the piston coupling in an initial position until the compensator piston applies enough pressure to the piston coupling to shear the shear pin; wherein the pressure applied by the compensator piston to the piston coupling is due to the thermal expansion of the oil in the oil chamber. The shunt closure may further comprise a spring coupled to the piston coupling. The spring may be configured to hold the piston coupling in an initial position until the compensator piston applies enough pressure to the piston coupling to compress the spring; wherein the pressure applied by the compensator piston to the piston coupling is due to the thermal expansion of the oil in the oil chamber. The spring may be coupled to the piston coupling within the piston chamber. The spring may be coupled to the piston coupling outside of the piston chamber. The compensator piston may be configured to compensate for the volumetric expansion of the oil from thermal expansion without altering the position of the shunt isolation sleeve. The shunt isolation sleeve may comprise a gravel transport pathway. The shunt isolation sleeve may be configured to translate towards the oil chamber thereby pushing the compensator piston, piston coupling, and piston housing towards the oil chamber; wherein this movement towards the oil chamber also closes the gravel transport pathway.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or" consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A shunt closure with a compensator piston, the shunt closure comprising:
    a compensator piston disposed between an oil chamber and a piston chamber and configured to translate towards the piston chamber to allow for an increase in the volume of the oil chamber;
    a piston coupling connected to the compensator piston; wherein a portion of the piston coupling is configured to translate into the piston chamber upon translation of the compensator piston;
    the piston chamber configured to house a portion of the piston coupling;
    the oil chamber configured to house an oil; wherein thermal expansion of the oil applies pressure to the compensator piston; and
    a shunt isolation sleeve coupled to and adjacent to the piston chamber.

2. The shunt closure of claim 1, wherein the compensator piston is configured such that thermal expansion of the oil applies pressure to the compensator piston to translate the compensator piston towards the piston chamber.

3. The shunt closure of claim 1, further comprising a shear pin coupled to the piston coupling.

4. The shunt closure of claim 3, wherein the shear pin is configured to hold the piston coupling in an initial position until the compensator piston applies enough pressure to the piston coupling to shear the shear pin; wherein the pressure applied by the compensator piston to the piston coupling is due to the thermal expansion of the oil in the oil chamber.

5. The shunt closure of claim 1, further comprising a spring coupled to the piston coupling.

6. The shunt closure of claim 5 wherein the spring is configured to hold the piston coupling in an initial position until the compensator piston applies enough pressure to the piston coupling to compress the spring; wherein the pressure applied by the compensator piston to the piston coupling is due to the thermal expansion of the oil in the oil chamber.

7. The shunt closure of claim 5, wherein the spring is coupled to the piston coupling within the piston chamber.

8. The shunt closure of claim 5, wherein the spring is coupled to the piston coupling outside of the piston chamber.

9. The shunt closure of claim 1, wherein the compensator piston is configured to compensate for the volumetric expansion of the oil from thermal expansion without altering the position of the shunt isolation sleeve.

10. The shunt closure of claim 1, wherein the shunt isolation sleeve comprises a gravel transport pathway.

11. The shunt closure of claim 10, wherein the shunt isolation sleeve is configured to translate towards the oil chamber thereby pushing the compensator piston, piston coupling, and piston housing towards the oil chamber; wherein this movement towards the oil chamber also closes the gravel transport pathway.

12. A method for compensating for pressure increases in the oil chamber of a shunt closure, the method comprises:
    providing a shunt closure comprising:
        a compensator piston disposed between an oil chamber and a piston chamber;
        a piston coupling connected to the compensator piston;
        the piston chamber configured to house a portion of the piston coupling;
        the oil chamber configured to house an oil; and
        a shunt isolation sleeve coupled to and adjacent to the piston chamber;
    translating the compensator piston towards the piston chamber to increase the volume of the oil chamber when thermal expansion of the oil occurs; and
    translating a portion of the piston coupling into the piston chamber upon translation of the compensator piston.

13. The method of claim 12, wherein the shunt closure further comprises a shear pin coupled to the piston coupling.

14. The method of claim 13, wherein the shear pin holds the piston coupling in an initial position until the compensator piston applies enough pressure to the piston coupling to shear the shear pin; wherein the pressure applied by the compensator piston to the piston coupling is due to the thermal expansion of the oil in the oil chamber.

15. The method of claim 12, wherein the shunt closure further comprises a spring coupled to the piston coupling.

16. The method of claim 15, wherein the spring holds the piston coupling in an initial position until the compensator piston applies enough pressure to the piston coupling to compress the spring; wherein the pressure applied by the compensator piston to the piston coupling is due to the thermal expansion of the oil in the oil chamber.

17. The method of claim 12, wherein the shunt isolation sleeve comprises a gravel transport pathway; wherein the method further comprises translating the shunt isolation sleeve towards the oil chamber thereby pushing the compensator piston, piston coupling, and piston housing towards the oil chamber; wherein this movement towards the oil chamber also closes the gravel transport pathway.

18. A system for compensating for pressure increases in the oil chamber of a shunt closure, the system comprises:
    a shunt closure comprising:
        a compensator piston disposed between an oil chamber and a piston chamber and configured to translate towards the piston chamber to increase the volume of the oil chamber;
        a piston coupling connected to the compensator piston; wherein a portion of the piston coupling is configured to translate into the piston chamber upon translation of the compensator piston;
        the piston chamber configured to house a portion of the piston coupling;

the oil chamber configured to house an oil; wherein thermal expansion of the oil applies pressure to the compensator piston; and a shunt isolation sleeve coupled to and adjacent to the piston chamber; and a conduit adjacent to the shunt closure.

19. The system of claim 18, wherein the shunt isolation sleeve comprises a gravel transport pathway; wherein the shunt isolation sleeve is configured to translate towards the oil chamber thereby pushing the compensator piston, piston coupling, and piston housing towards the oil chamber; wherein this movement towards the oil chamber also closes the gravel transport pathway.

20. The system of claim 19, wherein the conduit adjacent to the shunt closure transports gravel to the gravel transport pathway.

* * * * *